United States Patent
Chen

(10) Patent No.: US 6,990,872 B2
(45) Date of Patent: Jan. 31, 2006

(54) AUTOMATIC GEAR TRANSMISSION APPARATUS

(75) Inventor: Li-Yu Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 130 days.

(21) Appl. No.: 10/805,299

(22) Filed: Mar. 22, 2004

(65) Prior Publication Data

US 2005/0139024 A1 Jun. 30, 2005

(30) Foreign Application Priority Data

Dec. 30, 2003 (TW) .............................. 92137365 A

(51) Int. Cl.
  *F16H 59/00* (2006.01)
  *B60K 17/04* (2006.01)
(52) U.S. Cl. ...................................... 74/335; 74/473.12
(58) Field of Classification Search .................. 74/335, 74/336 R, 473.1–473.37
See application file for complete search history.

(56) References Cited

U.S. PATENT DOCUMENTS

| | | | | |
|---|---|---|---|---|
| 2,649,813 A | * | 8/1953 | Barth et al. ................... | 74/335 |
| 6,230,862 B1 | * | 5/2001 | Reik et al. .................. | 192/3.56 |
| 6,327,927 B1 | * | 12/2001 | Rogg et al. ................... | 74/335 |
| 2004/0112158 A1 | * | 6/2004 | Norum et al. ................ | 74/335 |

* cited by examiner

*Primary Examiner*—Tisha Lewis
(74) *Attorney, Agent, or Firm*—Troxell Law Office, PLLC

(57) ABSTRACT

An automatic gear transmission apparatus, capable of cooperating with a conventional manual transmission gearbox to provide an automatic gear transmission function. The automatic gear transmission apparatus comprises: a motor, a clutch mechanism, a gear selection mechanism, a gear transmission mechanism, and a sleeve rod. By operation of the clutch mechanism, output power from a single motor can be optionally transmitted out through the gear selection mechanism or the gear transmission mechanism. The power output by the gear selection mechanism can linearly activate the sleeve rod to proceed a gear selection action, while the power output by the gear transmission mechanism can rotationally activate the sleeve rod to proceed a gear transmission action. Therefore, using only a single motor can drive the sleeve rod linearly or rotationally to proceed two actions of gear selection and gear transmission, respectively.

22 Claims, 6 Drawing Sheets

AUTOMATIC GEAR TRANSMISSION APPARATUS

FIELD OF THE INVENTION

The invention relates to an automatic gear transmission apparatus, and in particular to an automatic gear transmission apparatus capable of cooperating with a conventional manual transmission gearbox to provide an automatic gear transmission function, wherein only a single motor is used to proceed two actions of gear selection and gear transmission.

BACKGROUND OF THE INVENTION

For the vehicles in the current market, besides two traditional gear transmission systems of manual gear transmission and automatic gear transmission, there is also a popular "manual-automatic transmission" speed-changing system, which not only makes driver enjoy the driving fun of manual transmission, but also makes driver enjoy easy operation and convenience of automatic transmission.

In brief, the basic principle of the so-called "manual-automatic transmission" speed-changing system is arranging a set of automatic transmission apparatus into a general manual transmission gearbox. By this set of automatic gear transmission apparatus, the driver needs not to step down or release off the clutch pedal (in fact, there is no clutch pedal arranged), but only to poke the transmission rod or press the transmission button on the steering wheel to generate a transmission signal to the automatic gear transmission apparatus, which then controls the manual transmission gearbox to proceed gear up or gear down action to achieve a driving effect similar to that of manual transmission. Of course, if the driver is too lazy to decide a transmission position by himself, then the transmission position of the transmission rod can be positioned at the position of automatic transmission. In this situation, the automatic gear transmission apparatus will be taken over and controlled by the driving computer arranged in the vehicle. The driving computer will automatically decide the transmission timing according to the preset conditions, for example, vehicle speed, rotating speed of the engine, etc.

Since a manual transmission gearbox usually has several transmission forks and each of which is connected to different gear in the gearbox, when a transmission fork is pushed, the engagements of the gears in the gearbox are changed to achieve the objective of speed-changing transmission. In other words, the automatic gear transmission apparatus arranged with the manual transmission gearbox must be able to provide two kinds of action, i.e. "gear selection" (selecting the transmission fork) and "gear transmission" (pushing the selected transmission fork). In the traditional and conventional automatic gear transmission apparatus, two sets of independent power sources are usually adapted for driving these two actions of "gear selection" and "gear transmission," respectively. For example, two sets of independent motors are adapted to actuate two sets of independent transmission mechanisms respectively to proceed "gear selection" and "gear transmission" sequentially, or an electromagnetic clutch is adapted for switching between "gear selection" and "gear transmission." However, there are still many shortcomings in the conventional automatic gear transmission apparatus as stated in the following:

1. Higher cost of hardware. The conventional automatic gear transmission apparatus needs to use two sets of motors to sequentially proceed "gear selection" and "gear transmission," so a relatively higher cost will be resulted from utilization of two sets of motors.

2. Higher consumption of energy. Under the operation state of the vehicle, the electromagnetic clutch is actuated frequently thus its energy consumption is relatively higher.

3. Higher cost of control. Some server and feedback driver must be adapted to achieve positioning control for "gear selection" and "gear transmission" actions, so its cost of controlling is relatively higher.

4. Larger limit of space. Since the conventional automatic gear transmission apparatus applies two sets of motors, the space occupied therein is relatively larger thus more restrictions on the position arrangement for each element are caused.

According to the above-mentioned drawbacks, the invention proposes an automatic gear transmission apparatus, capable of cooperating with a conventional manual transmission gearbox to provide an automatic gear transmission function, wherein only a single motor is used to proceed two kinds of action—"gear selection" and "gear transmission."

SUMMARY OF THE INVENTION

The main objective of the invention is to provide an automatic gear transmission apparatus, capable of cooperating with a conventional manual transmission gearbox to provide an automatic gear transmission function, wherein only a single motor is used to proceed two kinds of action—"gear selection" and "gear transmission," thus the invention has the advantages of "lower cost of hardware," "less consumption of energy," and "smaller limit of space."

Another objective of the invention is to provide an automatic gear transmission apparatus, which drives a clutch mechanism by means of an actuating apparatus such that the power of a motor can be optionally transmitted to one of the gear selection mechanism and the gear transmission mechanism, thus only a single motor is used to proceed two kinds of action, i.e., gear selection and gear transmission.

The further objective of the invention is to provide an automatic gear transmission apparatus, which applies an elastic element to press a positioning bead to be abutted against the recess located at the transmission fork to proceed a positioning action for gear selection and gear transmission. The position control is easy and without using any driving server, so the cost of controlling is relatively lower.

Summarizing the aforementioned descriptions, in a preferable embodiment of the automatic gear transmission apparatus proposed by the invention, the automatic gear transmission apparatus comprises: a power source, a clutch mechanism, an actuating apparatus, a gear selection mechanism, a gear transmission mechanism, and a sleeve rod. The clutch mechanism is connected to the power source, such that the power can be optionally output through a first transmitting mechanism or a second transmitting mechanism. The actuating apparatus is connected to the clutch mechanism to activate the clutch mechanism for controlling the power of the power source to be output from one of the first transmitting mechanism and the second transmitting mechanism. The power transmitted by the first transmitting mechanism drives the gear selection mechanism, while the power transmitted by the second transmitting mechanism drives the gear transmission mechanism. The position of the sleeve rod is corresponding to the plural transmission positions of the gearbox to proceed gear selection action and gear transmission action. The sleeve rod can be commonly driven by both of the gear selection mechanism and the gear transmission mechanism, wherein the gear selection mechanism drives the sleeve rod to proceed a linear motion and the gear transmission mechanism drives the sleeve rod to proceed a rotating motion. When the sleeve rod is driven by the gear selection mechanism to proceed a linear motion, it is switched between the plural transmission positions to proceed a gear selection action and, when the sleeve rod is driven by the gear transmission mechanism to proceed a rotating motion, it is pushed to the corresponding transmission position to proceed a gear transmission action. Therefore, the objective of using only one motor to sequentially proceed two kinds of action, i.e., gear selection and gear transmission, is accomplished.

In one preferable embodiment, the gear transmission mechanism is connected to the second transmitting mechanism and the sleeve rod, and the transmission mechanism further includes a rotary shaft that penetrates through and is arranged in the sleeve rod. Although the sleeve rod rotates together with the rotary shaft, it can proceed an axially relative linear motion on the rotary shaft. One end of the rotary shaft is connected to the second transmitting mechanism, by means of the power of the second transmitting mechanism, the rotary shaft can be actuated together with the sleeve rod to proceed a rotating motion. Furthermore, the gear selection mechanism is connected to the first transmitting mechanism and the sleeve rod. The gear selection mechanism further includes a rack sleeve fitted fixedly at outside of the sleeve rod. The rack sleeve is engaged with the first transmitting mechanism, by means of the power of the first transmitting mechanism, the rack can be actuated together with the sleeve rod to proceed an axially linear motion along the rotary shaft.

In another preferable embodiment, the power source is a motor that has an output shaft provided for outputting the rotating power of the motor. The clutch mechanism further includes: a coaxially driving gear, a first passive gear, a second passive gear, and a clutch sleeve. The coaxially driving gear is fitted fixedly to the output shaft of the motor and is actuated to rotate therewith. The first passive gear can be fitted to the output shaft of the motor with a relatively rotating manner and is positioned at one side of the coaxially driving gear. When the output shaft rotates, the first passive gear won't be actuated. A first clutch tooth and a first transmitting tooth are further arranged at the outer edge of the first passive gear. The first transmitting tooth is engaged with the first transmitting mechanism. Similarly, the second passive gear can be fitted at the output shaft of the motor with a relatively rotating manner and is located at another side of the coaxially driving gear. When the output shaft rotates, the second passive gear won't be actuated. At the outer edge of the second passive gear, a second clutch tooth and a second transmitting tooth are further arranged. The second transmitting tooth is engaged with the second transmitting mechanism. Furthermore, the clutch sleeve is fitted at the coaxial gear with a relatively linear manner and can be actuated to rotate therewith. A third clutch tooth is arranged at the clutch sleeve, which can be actuated to proceed an axially linear motion on the coaxially driving gear by means of an actuating mechanism.

Thereby, when the actuating mechanism actuates the clutch sleeve to linearly move to one side of the coaxially driving gear to make the third clutch tooth engaged with the first clutch tooth, the rotating power output from the motor will, through the first passive gear, drive the first transmitting mechanism to proceed a rotating transmission. When the actuating mechanism actuates the clutch sleeve to linearly move to another side of the coaxially driving gear to make the third clutch tooth engaged with the second clutch tooth, the output rotating power of the motor will, through the second passive gear, drive the second transmitting mechanism to proceed a rotating transmission.

In another preferable embodiment, the automatic gear transmission apparatus proposed by the invention further includes a shell provided for accommodating each element of the automatic gear transmission apparatus. A positioning bead and an elastic element are further arranged at a predetermined position, close to the sleeve rod, of the shell. The elastic element provides an elastic force to make the positioning bead abutted against the sleeve rod. Several recesses are further arranged at the sleeve rod at a position corresponding to the positioning bead. When the sleeve rod proceeds a linear motion, the positioning bead can be inset correspondingly with one of the several recesses for providing a positioning function.

In another preferable embodiment, the actuating mechanism further includes: a hydraulic cylinder, a piston, and a push rod. Controlled by an electromagnetic switch valve, the hydraulic cylinder then outputs power. The piston is connected to the hydraulic cylinder, which drives the piston to proceed a linear motion. The push rod is arranged at one side of the piston and is actuated thereby. The end side of the push rod is connected actively to the clutch sleeve. The piston can push the push rod to make the clutch sleeve proceed a linear motion on the coaxially driving gear.

DETAILED DESCRIPTION OF THE INVENTION

For better recognizing and understanding the characteristics, objectives, and functions of the invention, a detailed description together with accompanying diagrams are presented as follows.

The automatic gear transmission apparatus disclosed in the invention is mainly cooperated with a manual transmission gearbox (not shown in the figures) with plural transmission positions to provide a speed-changing function of "manual-automatic transmission." An ordinary manual transmission gearbox mostly includes: a gearbox, comprising plural of gears, and a gear transmission mechanism, comprising several transmission forks. By pushing different transmission forks, the engagements of the gears in the gearbox can be changed to generate different speed-reducing ratios to achieve the effect of speed-changing. By means of the transmission rod operated by the driver or the transmission button pressed by the driver or, according to the electronic control signal generated by the vehicle's computer, the automatic gear transmission apparatus of the invention pushes the specific transmission fork to achieve automatic gear transmission of the manual transmission gearbox. Several embodiments disclosing the structures, the activating manners, and the achieved effects of the automatic gear transmission apparatus according to the invention will be described in detail thereinafter.

Figure 1:
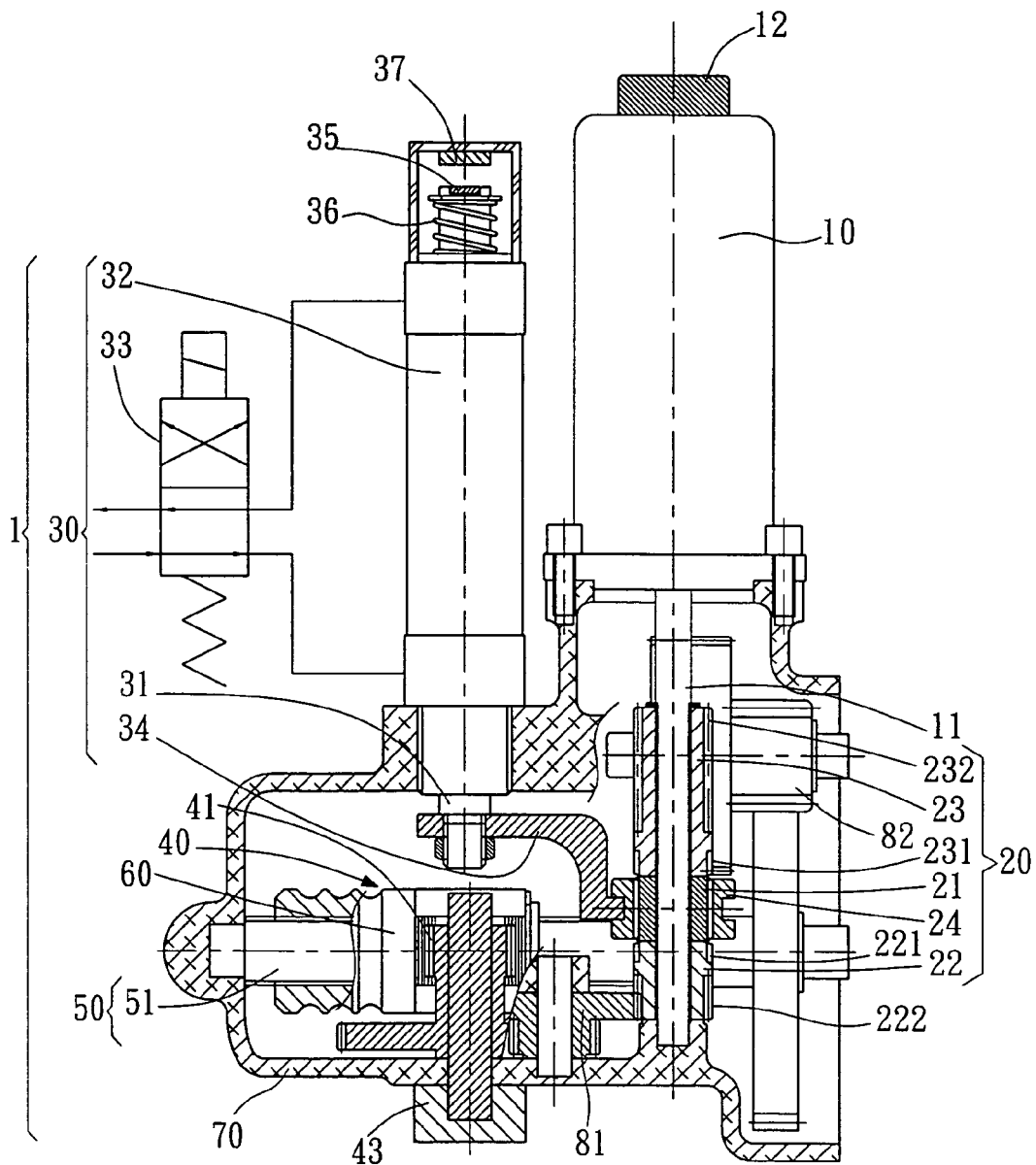
FIG. 1 is a cross-section illustration, in the first direction, of the first preferable embodiment of the automatic gear transmission apparatus according to the present invention.
Figure 2:
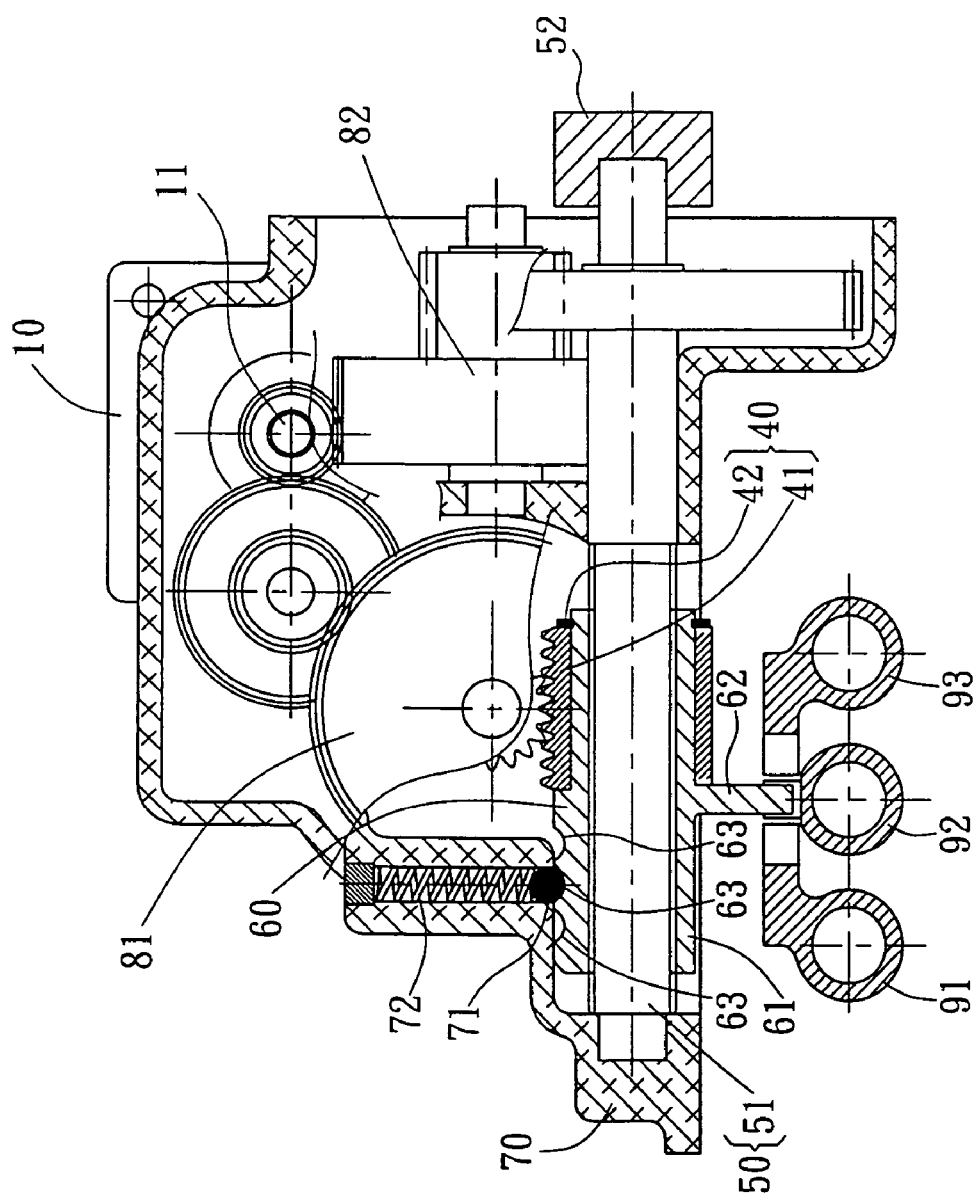
FIG. 2 is a cross-section illustration, in the second direction, of the first preferable embodiment of the automatic gear transmission apparatus according to the present invention.
Figure 3:
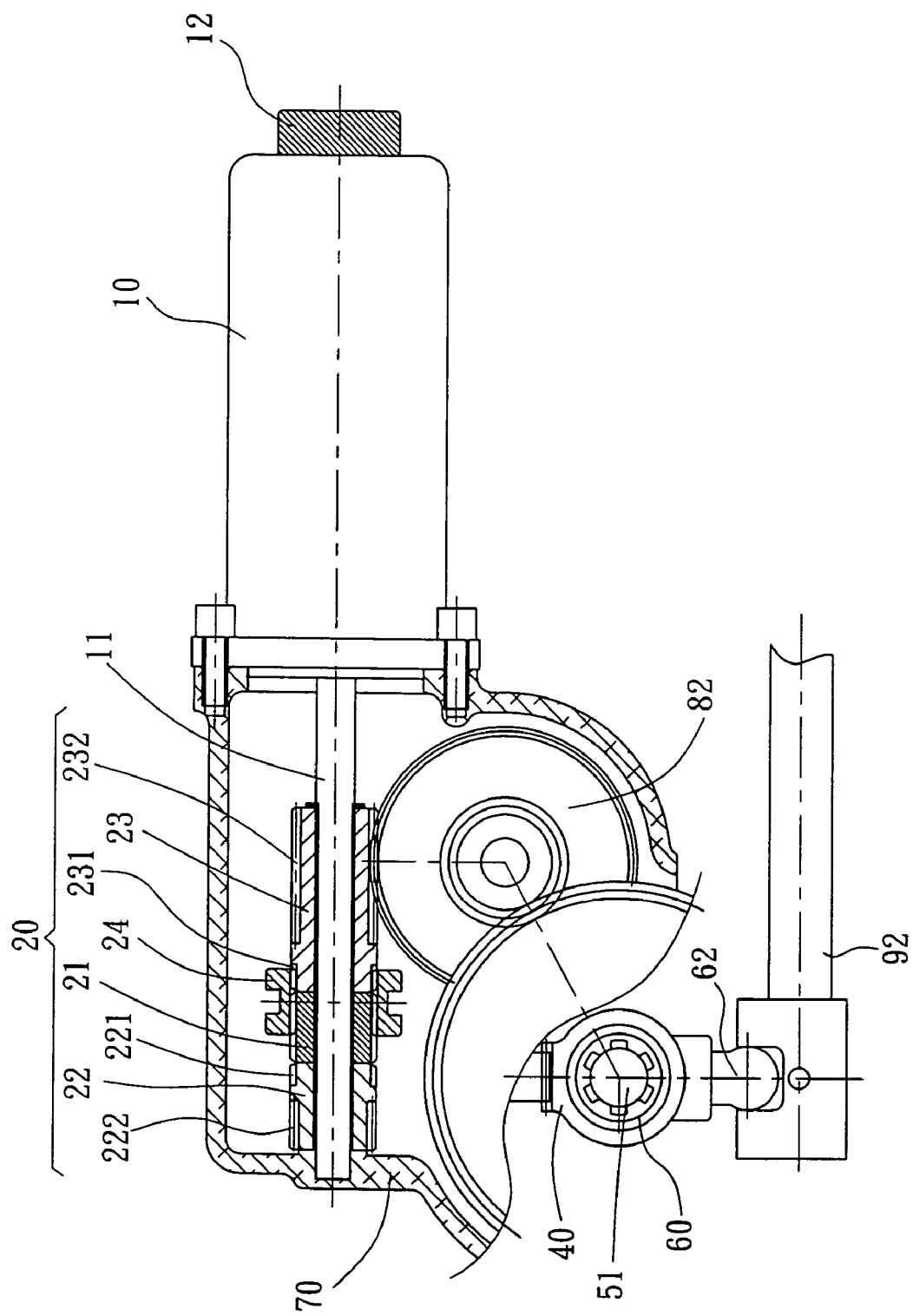
FIG. 3 is a cross-section illustration, in the third direction, of the first preferable embodiment of the automatic gear transmission apparatus according to the present invention.

Please refer to FIG. 1, FIG. 2, and FIG. 3, which show the first preferable embodiment of the automatic gear transmission apparatus according to the invention. Wherein, FIG. 1 is a cross-section illustration, in the first direction, of the first preferable embodiment of the automatic gear transmission apparatus according to the present invention. FIG. 2 is a cross-section illustration, in the second direction, of the first preferable embodiment of the automatic gear transmission apparatus according to the present invention. FIG. 3 is a cross-section illustration, in the third direction, of the first preferable embodiment of the automatic gear transmission apparatus according to the present invention.

In this preferable embodiment, the automatic gear transmission apparatus comprises: a motor 10, a clutch mechanism 20, an actuating apparatus 30, a gear selection mechanism 40, a gear transmission mechanism 50, a sleeve rod 60, and a shell 70 adapted for accommodating and positioning the said elements.

The motor 10, also the power source to drive gear selection action and gear transmission action, has an output shaft 11 provided for outputting the rotating power of the motor 10, on which an angular displacement feedback element 12 can be optionally added to sense and further control the rotating phase (i.e., the loops rotated) of the motor 10. Since the said angular displacement feedback element 12 belongs to the prior arts, a repetitious description is not presented in detail herein.

Connected to the motor 10, the clutch mechanism 20 makes the motor 10 optionally output the rotating power through a first gear set 81 (also called the first transmitting mechanism) or through a second gear set 82 (also called the second transmitting mechanism). In this preferable embodiment, the first gear set 81 and the second gear set 82 are speed-reducing gear sets. Since the speed-reducing gear set is a technique known by those who are skilled in such arts, its construction is not repetitiously described in detail thereinafter.

In this preferable embodiment, the clutch mechanism 20 further includes: a coaxially driving gear 21, a first passive gear 22, a second passive gear 23, and a clutch sleeve 24.

The coaxially driving gear 21 is fitted fixedly on the output shaft 11 by means of a key or a spline, such that the coaxially driving gear 21 can be actuated by the output shaft 11 to rotate synchronously. The first passive gear 22 is fitted on the output shaft 11 of the motor 10 with a relatively rotating manner and is positioned at one side (the lower side of FIG. 1) of the coaxially driving gear 21 and, the first passive gear 22 won't be actuated when the output shaft 11 rotates. A first clutch tooth 221 and a first transmitting tooth 222 are further arranged at the outer edge of the first passive gear 22. The first transmitting tooth 222 is engaged with one gear of the first gear set 81.

The second passive gear 23 is also fitted on the output shaft 11 of the motor 10 with a relatively rotating manner and is positioned at another side (the upper side of FIG. 1) of the coaxially driving gear 21, and the second passive gear 23 won't be actuated when the output shaft 11 rotates. A second clutch tooth 231 and a second transmitting tooth 232 are further arranged at the outer edge of the second passive gear 23. The second transmitting tooth 232 is engaged with one gear of the second gear set 82.

The clutch sleeve 24 is fitted on the coaxially driving gear 21 with a relatively linear manner and is thereby brought to rotate. A third clutch tooth is arranged at the clutch sleeve 24, which can be brought by the actuating apparatus 30 to proceed an axially linear motion on the coaxially driving gear 21. But, when the coaxially driving gear 21 rotates, the clutch sleeve 24 will be thereby brought to rotate.

In this preferable embodiment, the clutch sleeve 24 is driven by the actuating apparatus 30 to proceed a displacement switching motion such that, except for being engaged with the coaxially driving gear 21, the third clutch tooth of the clutch sleeve 24 can further be engaged with the clutch teeth 221/231 of the first passive gear 22 or the second passive gear 23 to achieve the objective of transmitting the rotating power of the motor 10 to one of the first gear set 81 and the second gear set 82. In other words, when the actuating apparatus 30 brings the clutch sleeve 24 to linearly move to one side (the lower side of FIG. 1) of the coaxially driving gear 21 to make the third clutch tooth engaged with the first clutch tooth 221, the rotating power output from the motor 10 will, through the first passive gear 22, drive the first gear set 81 to rotate. When the actuating apparatus 30 actuates the clutch sleeve 24 to linearly move to another side (the upper side of FIG. 1) of the coaxially driving gear 21 to make the third clutch tooth engaged with the second clutch tooth 231, the rotating power output from the motor 10 will, through the second passive gear 23, drive the second gear set 82 to rotate.

The actuating apparatus 30, connected to the clutch mechanism 20, can actuate the clutch sleeve 24 of the clutch mechanism 20 to proceed a linear motion to control the power of the motor 10 output from one of the first gear set 81 and the second gear set 82. In this preferable embodiment, the actuating apparatus 30 further includes: a piston 31, a hydraulic cylinder 32, an electromagnetic valve (electromagnetic switch valve) 33, and a push rod 34. The piston 31 is driven by the hydraulic cylinder 32 to proceed a linear motion, and the hydraulic cylinder 32 is then controlled by the electromagnetic valve 33 to decide the magnitude of the hydraulic pressure. The push rod 34 is arranged at one side of the piston 31 and is brought thereby. The end side of the push rod 31 is inset with a spline (no numeral marked) of the clutch sleeve 24 so, by means of the piston 31 to push the push rod 34, the clutch sleeve 24 can be poked to proceed an axially linear motion on the coaxially driving gear 21.

In this preferable embodiment, another side of the piston 31 (the upper side of FIG. 1) can be optionally added with a magnet 35, a relocation spring 36, and a Hall magnetically induced element 37. The Hall magnetically induced element 37 can detect the magnetism and position of the magnet 35 positioned at the end side of the piston 31 (i.e., detecting the position of the clutch sleeve 24) thus accordingly controls the actuating magnitude of the piston 31. The relocation spring 36 can then make the piston 31 back to a predetermined position when the hydraulic pressure is failed. Since the said Hall magnetically induced element 37 is known, its detailed construction will not be described repetitiously herein.

In this preferable embodiment, although the push rod 24 is actuated by the piston 31 pushed by the hydraulic cylinder 32, it is also possible to optionally connect the push rod to an electromagnetic valve in another embodiment not shown in the figure. The electromagnetic valve is driven by an electric power to provide a linearly reciprocating force for directly pushing the push rod and further switches the position of the clutch sleeve at the clutch mechanism. However, this arrangement is relatively violent and unstable for the displacing speed of the clutch sleeve.

It must be pointed out that the automatic gear transmission apparatus of the invention includes two powering elements, i.e., the motor 10 and the hydraulic cylinder 32 but, in fact, the motor 10 is the only one power source adapted for driving two sets of action, i.e., gear selection and gear transmission, and the hydraulic cylinder 32 is only adapted for switching the clutch mechanism 20. Since the actuating power (consumed power) needed to switch the clutch mechanism 20 is relatively less, the power supplied, the energy consumed, and the space occupied by the hydraulic cylinder are relatively less, thus the cost is also cheaper. Comparing with the prior arts that apply two sets of motors to proceed two kinds of action of gear selection and gear transmission, the invention relatively has the advantages of "lower cost of hardware", "less consumption of energy", and "smaller limit of space", etc.

Please refer to FIG. 2, the gear selection mechanism 40, connected to the first gear set 81, can receive the power input from the first gear set 81 to proceed the action of gear selection. The gear selection mechanism 40 further includes a rack sleeve 41, fitted on the sleeve rod 60 and fixed by a C-shaped buckling ring 42, such that a relative rotating motion occurs between the rack sleeve 41 and the sleeve rod 60, but it is impossible to generate a relative linear motion in the axial direction. The rack portion of the rack sleeve 41 is engaged with the first gear set 81, the power input from which can actuate the rack together with the sleeve rod 60 to proceed a linear motion along the axial direction.

The gear transmission mechanism 50 further includes a rotary shaft 51 penetrating through and arranged in the sleeve rod 60. The sleeve rod 60 is connected to the rotary shaft 51 by a spline or a guiding rail, such that the sleeve rod 60 can be actuated by the rotary shaft 51 to rotate therewith, but the sleeve rod 60 can still proceed an axially relative linear motion at the rotary shaft 51. One side of the rotary shaft 51 is connected to the second gear set 82, the power output from which can activate the rotary shaft 51 together with the sleeve 60 to proceed a rotating motion.

The sleeve rod 60 is a structure of arranging a poking rod 62 projecting from a hollow sleeve 61. The position of the poking rod 62 is corresponding to the positions of several transmission forks 91, 92, 93 (each fork is corresponding to certain speed-changing gear's position) of the speed-changing box. Wherein, when the power input from the first gear set 81 makes the sleeve rod 60 proceed a linear motion, the position of the poking rod 62 will be switched among the transmission forks 91, 92, 93 to provide a function of selecting the transmission fork (gear selection). When the power input from the second gear set 82 makes the sleeve rod 60 proceed a rotating motion, the poking rod 62 pokes the corresponding transmission fork 92 to provide a gear transmission function (as shown in FIG. 3).

Please refer to FIG. 2 again, a positioning bead 71 and an elastic element 72 (e.g., spiral spring) are further arranged at a predetermined position, close to the sleeve rod 60, of the shell 70. The elastic element 72 provides an elastic force to make the positioning bead 71 abutted against the sleeve rod 60. Furthermore, several recesses 63 (which can be V-shaped recesses) are arranged at predetermined positions, corresponding to the positioning bead 71, of the sleeve rod 60. When the sleeve rod 60 proceeds a linear motion, the positioning bead 71 will be correspondingly inset in one of the several recesses 63 to provide a mechanical positioning function. A displacement feedback sensor 52 can be further optionally added on the end side of the rotary shaft 51 to sense the rotating angle (i.e., the amount of rotating motion) of the sleeve rod 60. Another displacement feedback sensor 43 can also be optionally added on the first gear set 81 (as shown in FIG. 1) to sense the axial position (i.e., the amount of linear motion) of the sleeve rod 60. Since the automatic gear transmission apparatus 1 of the invention adopts the positioning bead 71 and the recesses 63 to provide the mechanical positioning function, the accuracy of the displacement feedback sensors 52, 43 adapted by the invention can not be too high and the controlling of the amount of rotating of the motor 10 can not be too strict either. Because the prior technique uses accurate server and feedback driver to achieve electronical positioning control, comparing with the prior technique, the automatic gear transmission apparatus 1 of the invention indeed has the advantage of "lower cost of control."

Figure 4:
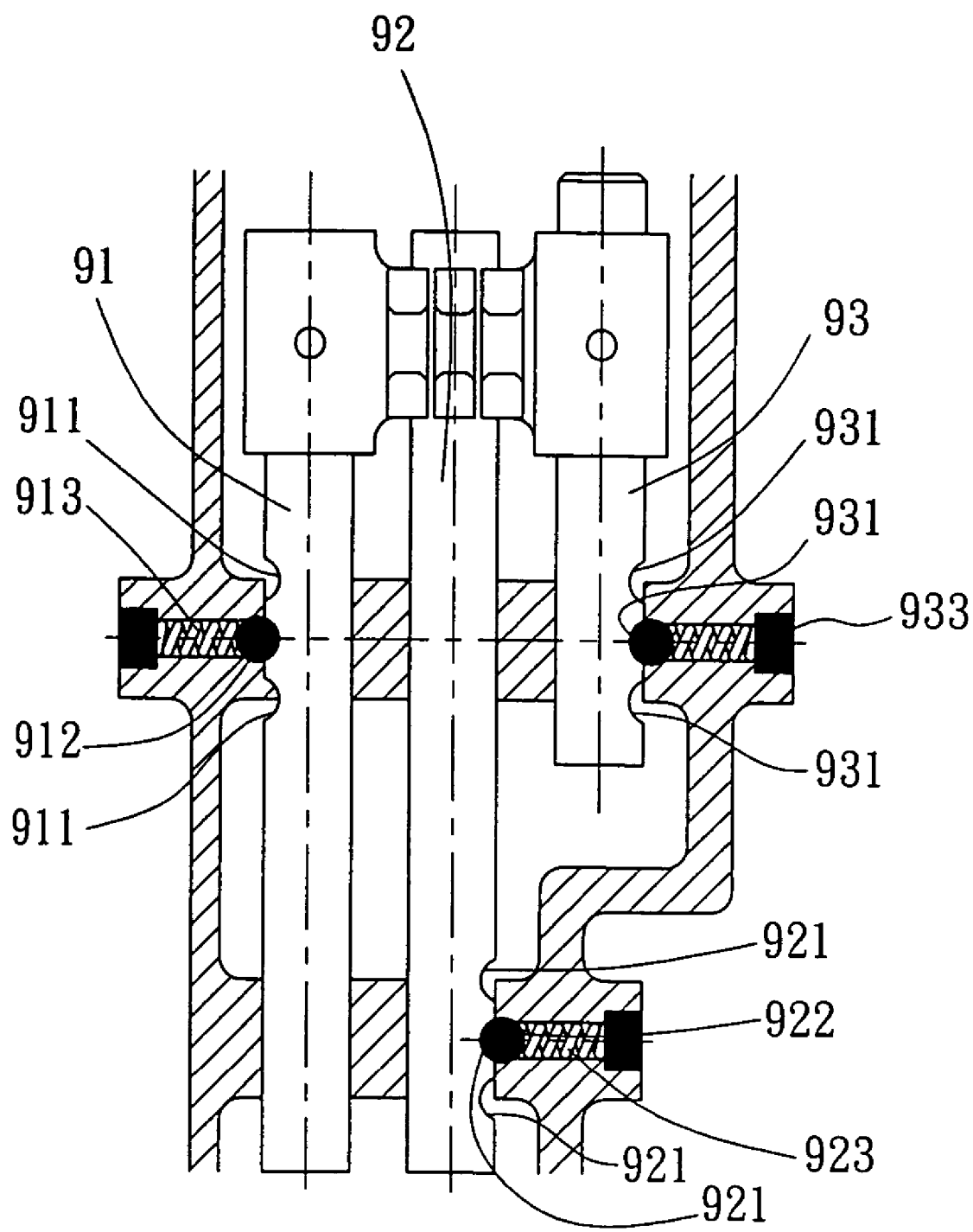
FIG. 4 is a cross-section illustration of the preferable embodiment of a positioning structure of plural transmission forks adapted cooperatively by the automatic gear transmission apparatus according to the invention.

Please refer to FIG. 4, which depicts a preferable embodiment of the positioning structure of plural transmission forks 91, 92, 93 adapted cooperatively with the automatic gear transmission apparatus 1 of the invention. The concept of the positioning bead 71 disclosed by the invention can also be adapted for the transmission forks 91, 92, 93 to provide a mechanical positioning function. As shown in FIG. 4, each of the transmission forks 91, 92, 93 is respectively corresponding to different transmission position of the gearbox and is respectively arranged with a positioning mechanism, which include: several recesses 911, 921, 931, positioning beads 912, 922, 932, and elastic elements 913, 923, 933. The elastic elements provide an elastic force to make the positioning beads 912, 922, 932 abutted against the transmission forks 91, 92, 93, thus when the transmission forks 91, 92, 93 proceed a linear motion, the positioning beads 912, 922, 932 can be inset in one of the several recesses 911, 921, 931 to provide the positioning function.

In the other embodiments described thereinafter, since most of their elements are the same or similar to those of the aforementioned embodiment, the same or similar elements will be assigned with the same element names and numerals, and their structures won't be repetitiously described in detail, but an English alphabet is appended to the original numeral for a distinguishing purpose.

Figure 5:
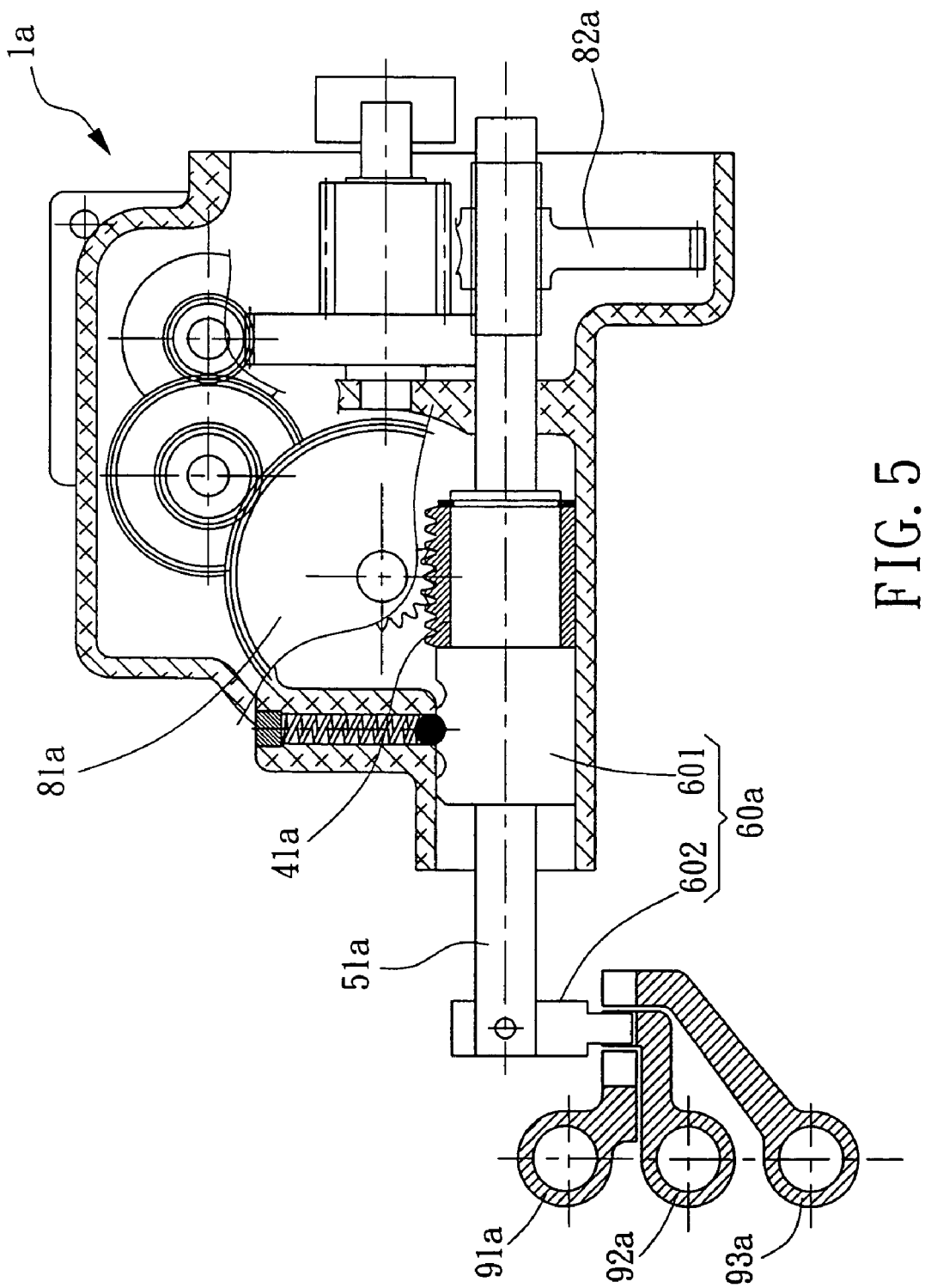
FIG. 5 is a cross-section illustration of the second preferable embodiment of the automatic gear transmission apparatus according to the present invention.

Please refer to FIG. 5, which is an illustration of the second preferable embodiment of the automatic gear transmission apparatus 1*a* of the invention. Most elements and functions of the automatic gear transmission apparatus 1*a* of this second preferable embodiment are substantially similar to those of the embodiment shown in FIGS. 1–3. The only difference is that the sleeve rod 60 shown in FIG. 2 is a single element in one body but, in the second embodiment shown in FIG. 5, the element is separated into two independent elements, i.e., the sleeve 601 and the poking rod 602. The sleeve 601 is still fitted at the rotary shaft 51*a* and can be driven by the second gear set 82*a* to rotate, while the poking rod 602 is directly fixed to the left end side of the rotary shaft 51*a* so, when the rotary shaft 51*a* rotates, the poking rod 602 will rotate as well to push the transmission fork 92*a*. Furthermore, the sleeve 601 is still arranged with a rack sleeve 41*a*, which is still engaged with a first gear set 81*a* so, when the first gear set 81*a* rotates, the sleeve 601, the rack sleeve 41*a*, and the rotary shaft 51*a* will be actuated together to proceed an axially linear motion and further bring the poking rod 602 to proceed an axially linear motion thus achieving the objective of selecting one of the transmission forks 91*a*, 92*a*, 93*a*.

Figure 6:
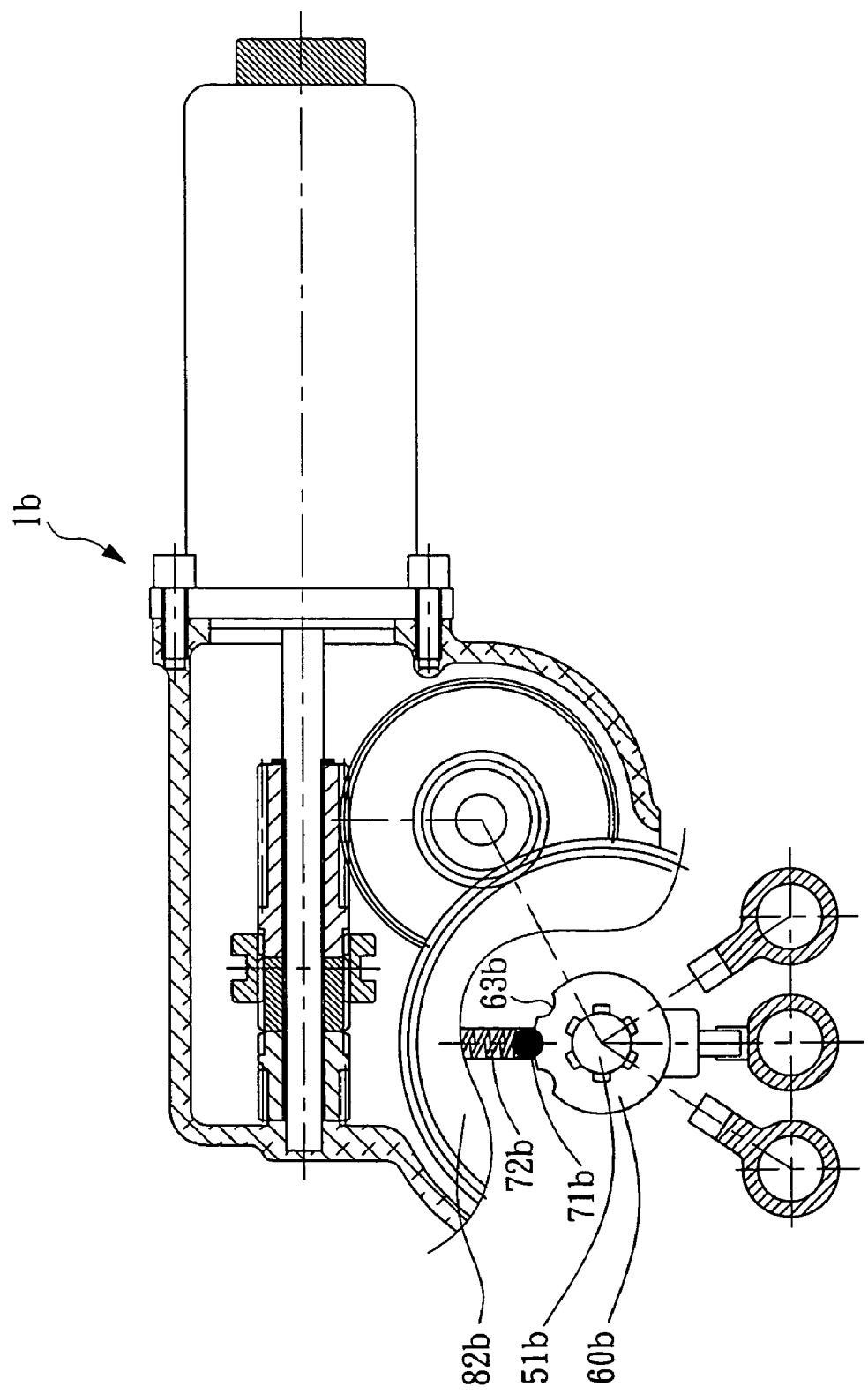
FIG. 6 is a cross-section illustration of the third preferable embodiment of the automatic gear transmission apparatus according to the present invention.

Please refer to FIG. 6, which is an illustration of the third preferable embodiment of the automatic gear transmission apparatus 1b of the invention. The difference between this embodiment and the previous embodiment is that gear selection (i.e., selecting a transmission fork) of the automatic gear transmission apparatus 1b of this preferable embodiment is proceeded by a rotating action of the sleeve rod 60b and, when the sleeve rod 60b proceeds an axially linear motion, gear transmission (i.e., pushing a transmission fork) is proceeded. As shown in FIG. 6, the gear selection mechanism includes a rotary shaft 51b penetrating through and arranged in the sleeve rod 60b, which rotates together with the rotary shaft 51b but can proceed a relative linear motion at the rotary shaft 51b. One side of the rotary shaft 51b is connected to the second gear set 82b, the input power of which can actuate the rotary shaft 51b to proceed a rotating motion together with the sleeve rod 60b. At this situation, the aforementioned positioning bead 71b, the elastic element 72b and the recess 63b are then arranged along the surrounding edge of the sleeve rod 60b.

To Sum up the above descriptions, the automatic gear transmission apparatus of the invention, by means of the designs of an actuating apparatus and a clutch mechanism, makes the power generated by the power source of a single motor can be optionally transmitted by one of the first gear set and the second gear set, such that only a single motor is used to proceed two kinds of action alternatively, i.e., gear selection and gear transmission. In addition, the automatic gear transmission apparatus of the invention adopts the positioning bead and the recess to provide a mechanical positioning function, so it is not necessary to apply the electronical positioning control proceeded by the accurate server and feedback driver. Therefore, comparing with the prior arts, the automatic gear transmission apparatus of the invention indeed has the advantages of "lower cost of hardware", "less consumption of energy", "smaller limit of space", and "lower cost of control", etc. and can completely overcome all of the mentioned drawbacks of the prior arts.

However, the above descriptions only direct to the preferable embodiments according to the invention, and it should not be regarded as a limitation to the executing ranges of the invention. Any equivalent variation and modification made according to the claims of the invention should be included within the ranges covered by the invention patent.

What is claimed is:

1. An automatic gear transmission apparatus, capable of cooperating with a gearbox having plural transmission positions, comprising:
    a motor, adapted for outputting a power;
    a clutch mechanism, connected to the motor, can optionally output the power of the motor through a first gear set or a second gear set;
    an actuating apparatus, connected actively to the clutch mechanism and adapted for actuating the clutch mechanism to control the power of the motor to be output from one of the first gear set and the second gear set;
    a gear selection mechanism, connected to the first gear set and adapted for receiving the power input from the first gear set to proceed a gear selection action; and
    a gear transmission mechanism, connected to the second gear set and adapted for receiving the power input from the second gear set to proceed a transmission action.

2. The automatic gear transmission apparatus of claim 1, wherein the automatic gear transmission apparatus further comprises a sleeve rod, which is driven by both of the gear selection mechanism and the gear transmission mechanism and, when one of the gear selection mechanism and the gear transmission mechanism drives the sleeve rod to proceed a rotating motion, the another one drives the sleeve rod to proceed a linear motion.

3. The automatic gear transmission apparatus of claim 2, wherein
    the gear selection mechanism further comprises a rack sleeve fitted fixedly at outside of the sleeve rod, which is engaged with the first gear set, the power from the first gear set can actuate the rack together with the sleeve rod to proceed an axially linear motion; and
    the gear transmission mechanism further comprises a rotary shaft that penetrates through and is arranged in the sleeve rod, which rotates together with the rotary shaft and can proceed an axially relative linear motion on the rotary shaft, one side of the rotary shaft is connected to the second gear set, the power from the second gear set can actuate the rotary shaft together with the sleeve rod to proceed a rotating motion.

4. The automatic gear transmission apparatus of claim 3, wherein the sleeve rod is a structure of a poking rod arranged at and projected from a hollow sleeve, the position of the projected poking rod is corresponding to the plural transmission positions of the gearbox, wherein
    when the power from the first gear set makes the sleeve rod proceed a linear motion, the position of the projected poking rod is switched between the transmission positions to provide a gear selection function; and
    when the power from the second gear set makes the sleeve rod proceed a rotating motion, the position of the projected poking rod pokes its corresponding transmission position to provide a gear transmission function.

5. The automatic gear transmission apparatus of claim 2, wherein the automatic gear transmission apparatus further comprises a shell for accommodating each element of the automatic gear transmission apparatus, and a positioning bead and an elastic element are further arranged at a predetermined position, close to the sleeve rod, of the shell, the elastic element provides an elastic force for making the positioning bead abut against the sleeve rod; several recesses are further arranged at the sleeve rod at a position corresponding to the positioning bead and, when the sleeve rod proceeds a linear motion, the positioning bead can be correspondingly inset in one of the several recesses to provide a positioning function.

6. The automatic gear transmission apparatus of claim 2, wherein
    the gear selection mechanism further comprises a rotary shaft that penetrates through and is arranged in the sleeve rod, which rotates together with the rotary shaft and can proceed an axially relative linear motion on the rotary shaft, one side of which is connected to the second gear set, the power from the second gear set can actuate the rotary shaft together with the sleeve rod to proceed a rotating motion; and
    the gear transmission mechanism further comprises a rack sleeve that is fitted fixedly at outside of the sleeve rod, which is engaged with the first gear set, the power from the first gear set can actuate the rack together with the sleeve rod to proceed an axially linear motion along the rotary shaft.

7. The automatic gear transmission apparatus of claim 6, wherein the sleeve rod is a structure of a poking rod arranged at and projected from a hollow sleeve, the position of the projected poking rod is corresponding to the plural transmission positions of the gearbox, wherein when the power from the second gear set makes the sleeve rod proceed a rotating motion, the position of the projected poking rod is switched between the transmission positions to provide a gear selection function; and when the power from the first gear set makes the sleeve rod proceed a linear motion, the position of the projected poking rod is poked to its corresponding transmission position to provide a gear transmission function.

8. The automatic gear transmission apparatus of claim 1, wherein the motor has an output shaft provided for outputting the rotating power of the motor, and the clutch mechanism further comprises:

a coaxially driving gear, fitted fixedly at the output shaft of the motor and is thereby actuated to rotate;

a first passive gear, fitted at the output shaft of the motor with a relative rotating motion manner and located at one side of the coaxially driving gear and, when the output shaft rotates, the first passive gear is not actuated, and a first clutch tooth and a first transmitting tooth are further included at the outer edge of the first passive gear, and the first transmitting tooth is engaged with the first gear set;

a second passive gear, fitted at the output shaft of the motor with a relative rotating motion manner and located at another side of the coaxially driving gear and, when the output shaft rotates, the second passive gear is not actuated, and a second clutch tooth and a second transmitting tooth are further included at the outer edge of the second passive gear, and the second transmitting tooth is engaged with the second gear set; and a clutch sleeve, fitted at the coaxially driving gear with a relative linear motion manner and thereby actuated to rotate, and a third clutch tooth is arranged at the clutch sleeve, the actuating apparatus can actuate the clutch sleeve to proceed an axially linear motion at the coaxially driving gear; wherein when the actuating apparatus brings the clutch sleeve to linearly move to one side of the coaxially driving gear and make the third clutch tooth and the first clutch tooth engage together, the rotating power output from the motor drives through the first passive gear, and the first gear set to rotate; and when the actuating apparatus brings the clutch sleeve to linearly move to another side of the coaxially driving gear and make the third clutch tooth and the second clutch tooth engage together, the rotating power output from the motor drives through the second passive gear, and the second gear set to rotate.

9. The automatic gear transmission apparatus of claim 8, wherein the actuating apparatus further comprises:

a piston, driven to proceed a linear motion; and a push rod, arranged at one side of the piston and is driven thereby, and the an end side of the push rod is connected actively to the clutch sleeve and, when driven by the piston, the push rod pushes the clutch sleeve to proceed a linear motion at the coaxially driving gear.

10. The automatic gear transmission apparatus of claim 9, wherein the piston is driven by a hydraulic cylinder, and the hydraulic cylinder is controlled by an electromagnetic switch valve.

11. The automatic gear transmission apparatus of claim 8, wherein the actuating apparatus further comprises:

an electromagnetic valve, driven by an electric power to provide a linear reciprocating driving force; and a push rod, connected to one side of the electromagnetic valve and is actuated thereby, and the an end side of the push rod is connected actively to the clutch sleeve and, when driven by the electromagnetic valve, the push rod pokes the clutch sleeve to proceed a linear motion at the coaxially driving gear.

12. The automatic gear transmission apparatus of claim 1, wherein the first gear set and the second gear set are speed-reducing gear sets.

13. The automatic gear transmission apparatus of claim 1, wherein the automatic gear transmission apparatus further comprises several transmission forks, and each transmission fork is respectively corresponding to one of the plural transmission positions of the gearbox, and each transmission fork is respectively arranged with a position mechanism, each position mechanism further comprises: several recesses, a positioning bead, and an elastic element, the elastic element provides an elastic force to make the positioning bead abut against the transmission fork and, when the transmission fork proceeds a linear motion, the positioning bead is correspondingly inset with one of the several recesses to provide a positioning function.

14. The automatic gear transmission apparatus of claim 1, wherein a displacement feedback sensor is respectively arranged at the gear selection mechanism and the gear transmission mechanism to detect the positions and states of the gear selection and the gear transmission.

15. An automatic gear transmission apparatus, capable of cooperating with a gearbox having plural transmission positions, comprises:

a power source, adapted for outputting a power;

a clutch mechanism, connected to the power source, can optionally output the power through a first transmitting mechanism or a second transmitting mechanism;

an actuating apparatus, connected actively to the clutch mechanism and adapted for actuating the clutch mechanism to control the power of the power source to be output through one of the first transmitting mechanism or the second transmitting mechanism; and a sleeve rod, the position of which is corresponding to the plural transmission positions of the gearbox to proceed a gear selection action and a gear transmission action, and the sleeve rod can be commonly driven by both of the first transmitting mechanism and the second transmitting mechanism, wherein the first transmitting mechanism drives the sleeve rod to proceed a linear motion, and the second transmitting mechanism drives the sleeve rod to proceed a rotating motion.

16. The automatic gear transmission apparatus of claim 15, wherein, when driven by the first transmitting mechanism to proceed a linear motion, the sleeve rod switches among the plural transmission positions to proceed a gear selection, when driven by the second transmitting mechanism to proceed a rotating motion, the sleeve rod pushes its corresponding transmission position to proceed a gear transmission.

17. The automatic gear transmission apparatus of claim 15, wherein, when driven by the second transmitting mechanism to proceed a rotating motion, the sleeve rod switches among the plural transmission positions to proceed a gear selection, when driven by the first transmitting mechanism to proceed a linear motion, the sleeve rod pushes its corresponding transmission position to proceed a gear transmission.

18. The automatic gear transmission apparatus of claim 15, wherein the automatic gear transmission apparatus further comprises:
- a gear selection mechanism, connected to the first transmitting mechanism and the sleeve rod, further includes a rotary shaft that penetrates through and is arranged in the sleeve rod, which rotates together with the rotary shaft and can proceed an axially relative linear motion at the rotary shaft, one side of the rotary shaft is connected to the first transmitting mechanism, the power from the first transmitting mechanism can actuate the rotary shaft together with the sleeve rod to proceed a rotating motion; and
- a gear transmission mechanism, connected to the second transmitting mechanism and the sleeve rod, further includes a rack sleeve that is fitted fixedly at outside of the sleeve rod and is engaged with the second transmitting mechanism, the power from the second transmitting mechanism can actuate the rack together with the sleeve rod to proceed an axially linear motion along the rotary shaft.

19. The automatic gear transmission apparatus of claim 15, wherein the power source is a motor having an output shaft provided for outputting the rotating power of the motor, and the clutch mechanism further comprises:
- a coaxially driving gear, fitted fixedly at the output shaft of the motor and is thereby actuated to rotate;
- a first passive gear, fitted at the output shaft of the motor with a relative rotating motion manner and located at one side of the coaxially driving gear and, when the output shaft rotates, the first passive gear is not actuated, and a first clutch tooth and a first transmitting tooth are further included at the outer edge of the first passive gear, and the first transmitting tooth is engaged with the first transmitting mechanism;
- a second passive gear, fitted at the output shaft of the motor with a relative rotating motion manner and located at another side of the coaxially driving gear and, when the output shaft rotates, the second passive gear is not actuated, and a second clutch tooth and a second transmitting tooth are further included at the outer edge of the second passive gear, and the second transmitting tooth is engaged with the second transmitting mechanism; and
- a clutch sleeve, fitted at the coaxially driving gear with a relative linear motion manner and thereby actuated to rotate, and a third clutch tooth is arranged at the clutch sleeve, the actuating apparatus can actuate the clutch sleeve to proceed an axially linear motion at the coaxially driving gear; wherein
- when the actuating apparatus brings the clutch sleeve to linearly move to one side of the coaxially driving gear and make the third clutch tooth and the first clutch tooth engage together, the rotating power output from the motor drives through the first passive gear, and the first transmitting mechanism to rotate; and
- when the actuating apparatus brings the clutch sleeve to linearly move to another side of the coaxially driving gear and make the third clutch tooth and the second clutch tooth engage together, the rotating power output from the motor drives through the second passive gear, and the second transmitting mechanism to rotate.

20. The automatic gear transmission apparatus of claim 15, wherein the automatic gear transmission apparatus further comprises a shell for accommodating each element of the automatic gear transmission apparatus, and a positioning bead and an elastic element are further arranged at a predetermined position, close to the sleeve rod, of the shell, the elastic element provides an elastic force for making the positioning bead abut against the sleeve rod; several recesses are further arranged at the sleeve rod at a position corresponding to the positioning bead and, when the sleeve rod proceeds a linear motion, the positioning bead can be correspondingly inset in one of the several recesses to provide a positioning function.

21. The automatic gear transmission apparatus of claim 15, wherein the first transmitting mechanism and the second transmitting mechanism are speed-reducing gear sets.

22. The automatic gear transmission apparatus of claim 15, wherein the actuating apparatus further comprises:
- a hydraulic cylinder, controlled by an electromagnetic switch valve to thereby output a power;
- a piston, connected to the hydraulic cylinder and driven by the hydraulic cylinder to proceed a linear motion; and
- a push rod, arranged at one side of the piston and is driven thereby, and the an end side of the push rod is connected actively to the clutch sleeve and, when driven by the piston, the push rod pushes the clutch sleeve to proceed a linear motion at the coaxially driving gear.

* * * * *